US00RE47008E

(19) United States
(12) Reissued Patent
Kuehn

(10) Patent Number: US RE47,008 E
(45) Date of Reissued Patent: Aug. 28, 2018

(54) SPILL CONTAINMENT SYSTEM

(71) Applicant: Franklin Fueling Systems, Inc., Madison, WI (US)

(72) Inventor: Justin F. Kuehn, Sun Prairie, WI (US)

(73) Assignee: Franklin Fueling Systems, LLC, Madison, WI (US)

(21) Appl. No.: 14/868,791

(22) Filed: Sep. 29, 2015

Related U.S. Patent Documents

Reissue of:
(64) Patent No.: 8,684,024
Issued: Apr. 1, 2014
Appl. No.: 12/904,530
Filed: Oct. 14, 2010

U.S. Applications:
(60) Provisional application No. 61/252,311, filed on Oct. 16, 2009.

(51) Int. Cl.

| | |
|---|---|
| ***B65D 21/00*** | (2006.01) |
| ***F16K 51/00*** | (2006.01) |
| ***B65D 90/10*** | (2006.01) |
| ***B65D 90/24*** | (2006.01) |
| ***B65D 90/50*** | (2006.01) |
| ***B67D 7/32*** | (2010.01) |

(52) U.S. Cl.
CPC ..... *B65D 90/105* (2013.01); *B65D 90/24* (2013.01); *B65D 90/503* (2013.01); *B67D 7/3209* (2013.01); *Y10T 29/49815* (2015.01); *Y10T 29/49817* (2015.01); *Y10T 137/5762* (2015.04)

(58) Field of Classification Search
CPC ..... B65D 88/76; B65D 90/24
USPC ..... 137/312; 141/86; 404/25; 405/52
See application file for complete search history.

(56) References Cited

U.S. PATENT DOCUMENTS

| | | | | |
|---|---|---|---|---|
| 4,655,361 | A | 4/1987 | Clover et al. | |
| 4,696,330 | A | 9/1987 | Raudman et al. | |
| 4,762,440 | A | 8/1988 | Argandona | |
| 4,770,317 | A * | 9/1988 | Podgers | B67D 7/362 141/86 |
| 4,793,387 | A * | 12/1988 | LeBlanc et al. | 137/312 |
| 4,842,443 | A * | 6/1989 | Argandona | 137/312 |
| 4,896,705 | A * | 1/1990 | Podgers et al. | 141/86 |
| 5,295,535 | A | 3/1994 | Boles et al. | |
| 7,069,965 | B2 | 7/2006 | Pendleton et al. | |
| 7,144,189 | B1 | 12/2006 | Bongiovanni et al. | |
| 7,171,994 | B1 | 2/2007 | O'Brien | |

(Continued)

FOREIGN PATENT DOCUMENTS

| | | |
|---|---|---|
| EP | 2 311 774 | 4/2011 |

OTHER PUBLICATIONS

Extended Search Report dated May 24, 2011 in corresponding EP Application No. 10 01 3480.

(Continued)

*Primary Examiner* — Sara Clarke
(74) *Attorney, Agent, or Firm* — Faegre Baker Daniels LLP

(57) ABSTRACT

A spill containment system is attachable to a riser pipe with an axially moveable seal. The spill containment system allows access to a drop tube in the riser pipe via a removable liquid communication assembly. The spill containment system includes a sealed interstitial space, which remains sealed during installation, service and use of the system. The spill containment system is protected by a weather resistant cover assembly.

19 Claims, 16 Drawing Sheets

(56) References Cited

U.S. PATENT DOCUMENTS

| | | | | |
|---|---|---|---|---|
| 2008/0023075 | A1 | 1/2008 | Bravo et al. | |
| 2009/0006026 | A1 | 1/2009 | Clover | |
| 2009/0223595 | A1 | 9/2009 | Kane et al. | |
| 2010/0116354 | A1* | 5/2010 | Rowe | B65D 90/105 137/312 |

OTHER PUBLICATIONS

European Search Report dated Feb. 15, 2011 in corresponding EP Application No. 10013480.8.
European Search Report dated May 24, 2011 in corresponding EP Application No. 10013480.

* cited by examiner

SPILL CONTAINMENT SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application [claims] *is a broadening reissue application of and claiming priority to U.S. Pat. No. 8,684,024, entitled "SPILL CONTAINMENT SYSTEM," issued Apr. 1, 2014, which was based upon U.S. patent application Ser. No. 12/904,530, filed Oct. 14, 2010, which claimed* the benefit under Title 35, U.S.C. §119(e) of U.S. Provisional Patent Application Ser. No. 61/252,311, entitled SPILL CONTAINMENT SYSTEM, filed Oct. 16, 2009, the [disclosure] *disclosures* of which [is] *are* expressly incorporated by reference herein in [its entirety] *their entireties*.

BACKGROUND

1. Technical Field

The present disclosure relates to a spill containment system for use with a fill pipe. More particularly, the present relation relates to a spill containment system for use in conjunction with a riser pipe of an underground storage container, such as an underground fuel storage tank, and to a method for using the same.

2. Brief Description of the Related Art

Liquid storage tanks are used for storage and distribution of a variety of liquids, such as reactants, solvents, chemical byproducts and finished materials. Underground liquid storage tanks for storing fuel are in wide spread use at gasoline service stations and fuel storage facilities. These liquid storage tanks are repetitively depleted and refilled via fill pipes or couplings located at the exterior of the storage tank. Spillage may occur during refilling, such as by tank overfilling, weak line connections, drainage from disconnected lines, faulty gaskets, leaky valve seals or the like.

Spillage of hazardous materials, such as fuel or chemicals, into the surrounding environment should be minimized. In addition to wasted liquid material, the hazardous chemicals may leach into the soil causing environmental problems, such as ground water contamination. In recognition of this threat, a variety of local, state and federal laws currently exist to regulate the use of underground liquid storage systems. For example, fill locations at some underground storage tanks are required have an overspill device capable of containing at least five gallons of liquid. Such an overspill device is located proximal a riser pipe extending from the underground storage tank to the ground above. Typically, a hose coupler or other attachment pipe is in fluid communication with the riser pipe, and is used as the port for liquid delivery or extraction. A receptacle or bucket surrounds the attachment pipe and is designed to act as a spill catch, such as for capturing any overfill or spillage resulting from transferring a load of fluid to the underground storage tank. For example, a spill receptacle may be used to catch fuel spillage when filling underground fuel storage tanks from a fuel delivery truck.

Spill containers located around fluid storage tank fill ports may be set in the ground, such as in the concrete drive of a fueling station. Concrete subsidence, or the motion of the concrete surface as it shifts downward relative to a datum, and concrete uplift, or an upward shift relative to the datum, are naturally occurring phenomena resulting from seasonal effects, extraction or dissolution of underground materials, and other causes. Since overspill devices have an opening coincident with grade level, they must accommodate movement due to uplift and subsidence. Further, since the overspill device must form a liquid tight seal between the interior of the spill receptacle and the surrounding area, a liquid tight engagement between the spill device and the riser pipe and any adjacent installation structures must also be capable of movement due to uplift and subsidence.

Given the relatively long service life of underground storage tanks, it is desirable for overspill devices installed to storage tank riser pipes to have a comparatively long service life and/or be easily replaceable. It is also desirable to minimize the effort and time required for routine maintenance tasks. For example, many riser pipes include a drop tube at the upper end of the riser pipe which may include a protection device, such as an overfill prevention device. These drop tube devices may require frequent inspection: in some jurisdictions, for example, a drop-tube mounted overfill prevention device may require monthly inspection. Moreover, the drop tube itself and/or any number of other devices may require periodic inspection. Thus, facilitation of routine maintenance to an overspill containment device should include easy access to the drop tube located in the riser pipe.

Because overspill devices are located in a wide variety of locations and climates, these devices encounter all manner of extreme weather. A cover or a manhole is one method of protecting the fill pipe and overspill containment device from precipitation and environmental degradation. In this harsh service environment, a manhole system is preferably highly weather resistant and capable of withstanding any associated rigors, such as the driving of snowplows over the manhole cover.

SUMMARY

The present disclosure provides a spill containment system attachable to a riser pipe with an axially moveable seal. The spill containment system allows access to a drop tube in the riser pipe via a removable liquid communication assembly. The spill containment system includes a sealed interstitial space, which remains sealed during installation, service and use of the system. The spill containment system is protected by a weather resistant cover assembly.

In one embodiment thereof, the present invention provides a fluid spill collector assembly comprising: a primary receptacle including: an upper primary receptacle end having an upper primary receptacle opening; a lower primary receptacle end having a lower primary receptacle opening; a primary receptacle wall extending between the upper and lower primary receptacle ends, the primary receptacle wall defining a primary receptacle cavity; a secondary receptacle including: an upper secondary receptacle end having an upper secondary receptacle opening; a lower secondary receptacle end having a lower secondary receptacle opening; and a secondary receptacle wall extending between the upper and lower secondary receptacle ends, the secondary receptacle wall defining a secondary receptacle cavity, the primary receptacle received within the secondary receptacle cavity, the upper primary receptacle opening sealingly coupled to the upper secondary receptacle opening to form a sealed upper end of the assembly; and a single, unitary tank adapter having a base platform with a central aperture extending therethrough, the base platform sealingly coupled to the primary lower receptacle opening and the secondary lower receptacle opening to form a sealed lower end of the assembly, the sealed upper end and lower ends of the assembly cooperating to form a sealed interstitial space between the primary receptacle wall and the secondary receptacle wall, wherein the primary receptacle cavity remains in fluid communication with the upper primary receptacle opening and the central aperture of the tank adapter while the interstitial space is sealed.

In another embodiment thereof, the present invention provides a fluid spill collector assembly comprising: a stationary collar having an inner peripheral surface; and a double-walled spill container assembly comprising: an outer receptacle having a first open upper end, the outer receptacle sized to be receivable within the collar; an inner receptacle having a second open upper end, the inner receptacle coupled to the outer receptacle to create a sealed interstitial space therebetween; and a seal coupled to at least one of the outer receptacle and inner receptacle, the seal slidably engageable with the inner peripheral surface of the collar to create a fluid tight seal between the collar and the spill container assembly, the spill container assembly axially moveable with respect to the stationary collar while the interstitial space remains sealed.

In yet another embodiment thereof, the present invention provides a fluid spill collector assembly comprising: a double-walled spill container assembly comprising: a primary receptacle having a primary open upper end and a primary receptacle cavity; and a secondary receptacle having a secondary open upper end a secondary receptacle cavity, the primary receptacle received within the secondary receptacle cavity via the secondary open upper end to create a sealed interstitial space between the primary receptacle and the secondary receptacle, the primary receptacle cavity remaining accessible while the interstitial space is sealed; and a vacuum system comprising: a vacuum generator operable to create a vacuum pressure; a vacuum conduit in fluid communication with the interstitial space and the vacuum generator; a vacuum monitoring device in fluid communication the interstitial space, the vacuum monitoring device including a processor monitoring the vacuum pressure created by the vacuum generator, the processor operable to determine a rate of change of the vacuum pressure.

In still another embodiment thereof, the present invention provides a cover assembly comprising: a collar including: an upper collar portion; a lower collar portion; and an inner collar peripheral surface extending from the upper portion and the lower portion, the inner collar peripheral surface having at least one radial collar aperture formed therein; a cover ring at least partially received within the collar, the cover ring including: an upper ring portion; a lower ring portion; an inner ring peripheral surface extending between the upper ring portion and the lower ring portion; and an outer ring peripheral surface opposite the inner ring peripheral surface, the cover ring having at least one radial ring aperture extending from the inner ring peripheral surface to the outer ring peripheral surface; a fastener extending radially through the ring aperture and into the collar aperture to fix the cover ring to the collar; and a cover receivable within the cover ring, the cover blocking access to the inner collar peripheral surface and the fastener when the cover is received within the cover ring.

In still another embodiment thereof, the present invention provides a method of using a fluid spill collector assembly, comprising: removing a cover from a cover receiving surface to expose an inner cavity of a spill receptacle; retrieving a drain valve actuator from within the inner cavity; attaching the drain valve actuator to the cover receiving surface to open a drain valve disposed within the inner cavity, the step of attaching the drain valve actuator blocking a portion of the cover receiving surface; wherein the step of attaching the drain valve actuator prevents replacement of the cover upon the receiving surface.

In still another embodiment thereof, the present invention provides a method of inspecting a drop tube of the inlet pipe, the method comprising: providing a double-walled spill container assembly comprising: a primary receptacle having a primary receptacle cavity; a secondary receptacle having a secondary receptacle cavity sized to receive the primary receptacle; and a tank adapter having a base platform coupled to the primary and secondary receptacles to form a sealed interstitial space therebetween, the tank adapter having an aperture in fluid communication with the primary receptacle cavity; accessing a liquid communication assembly received within the primary receptacle cavity, the liquid communication assembly including a drop tube riser clamp at a lower end thereof and a coupler at an upper end thereof, the drop tube riser clamp engaged with the tank adapter at the aperture; decoupling the liquid communication assembly from the tank adapter by disengaging the drop tube riser clamp from the tank adapter, the step of decoupling the liquid communication assembly exposing the aperture of the tank adapter; and removing the drop tube from the spill container assembly by extracting the drop tube through the aperture of the tank adapter.

BRIEF DESCRIPTION OF THE DRAWINGS

The above-mentioned and other features and advantages of this invention, and the manner of attaining them, will become more apparent and the invention itself will be better understood by reference to the following descriptions of embodiments of the invention taken in conjunction with the accompanying drawings, wherein.

Corresponding reference characters indicate corresponding parts throughout the several views. The exemplifications set out herein illustrate preferred embodiments of the invention and such exemplifications are not to be construed as limiting the scope of the invention in any manner.

DETAILED DESCRIPTION

Figure 1A:
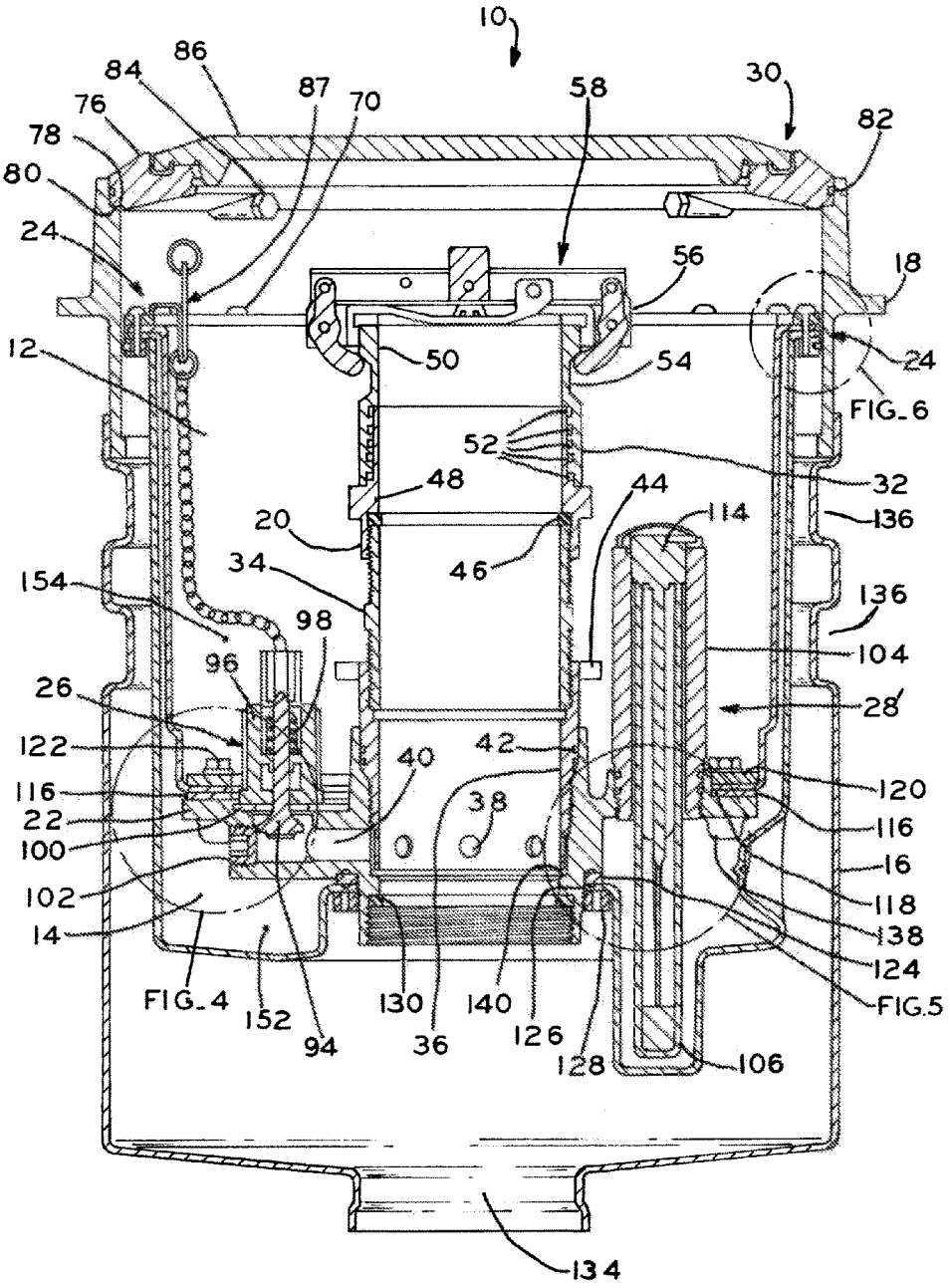
FIG. 1A is an elevation, section view of a spill collection system in accordance with the present disclosure.
Figure 1B:
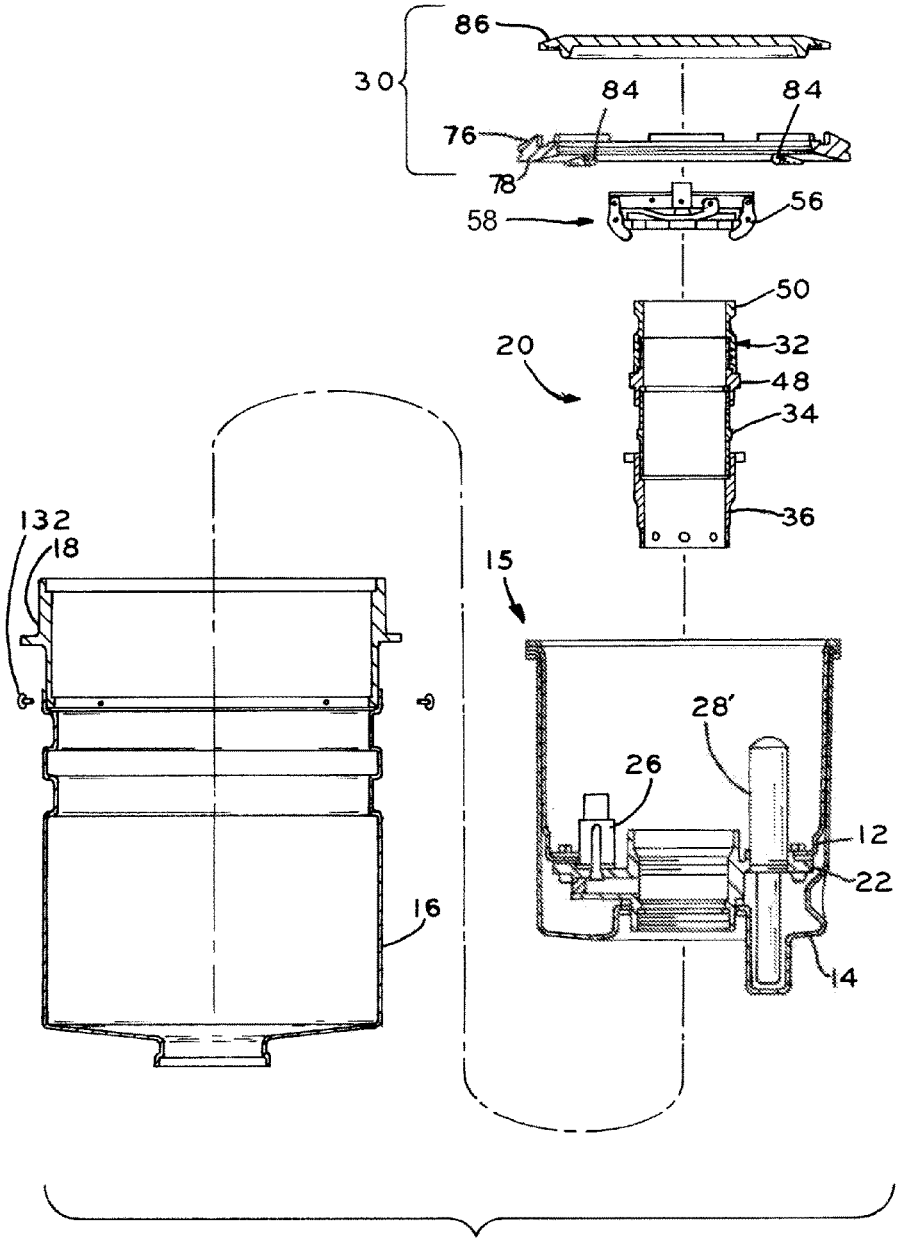
FIG. 1B is an elevation, partial section view of the spill collection system shown in FIG. 1A, illustrating subassemblies.

Referring generally to FIGS. 1A and 1B, a spill collection system 10 includes a primary, inner spill receptacle 12 received within a secondary, outer spill receptacle 14, which in turn is at least partially received by gravel guard or exterior wall 16 at a lower end and concrete ring or collar 18 at an upper end. In the illustrated embodiment, exterior wall 16 and collar 18 are considered to be stationary, in that they are permanently or semi-permanently installed at a subterranean storage tank access point. Primary spill receptacle 12 has a generally cylindrical wall with openings formed at the upper and lower ends thereof, while secondary spill receptacle 14 has a larger (i.e., increased diameter) cylindrical wall also having openings formed at the upper and lower ends of thereof. As discussed below, primary spill receptacle 12 is "nested" within secondary spill receptacle 14, so that the upper opening of receptacle 12 remains open while the upper opening of receptacle 14 is sealed.

The lower openings are sealed with respect to one another via tank adapter 22. Referring to FIG. 1A, liquid communication assembly 20 is sealingly, threadably coupled with a central aperture formed in tank adapter 22. A base platform of tank adapter 22 extends radially outwardly from the central aperture thereof, and is sealingly coupled to the lower opening of primary spill receptacle 12. The base platform of tank adapter 22 can present a liquid-tight barrier between the lower openings of receptacles 12, 14, thereby forming a sealed lower end of spill collection system 10 as described in detail below.

Upper gasket assembly 24 couples primary and secondary spill receptacles 12, 14 and provides a liquid-tight seal against a lower portion of collar 18 (FIG. 6). Spill collection system 10 optionally includes a drain valve assembly 26 for draining fluid contained within primary spill receptacle 12 to liquid communication assembly 20. Spill collection system 10 also optionally includes inspection port assembly 28 (without a gauge as shown in FIG. 7A) or 28' (with a gauge as shown in FIG. 1A) for monitoring fluid accumulation in secondary spill receptacle 14.

A cover assembly 30 cooperates with an upper portion of collar 18 to create an enclosed space bounded by the base portion of tank adapter 22 at the bottom, primary spill collector 12 along the lower sides, collar 18 along the upper sides, and cover assembly 30 at the top. This enclosed space is adapted to contain any fluid collecting within cavity 154 of primary spill receptacle 12, such as seepage from above or fuel spilled from the connection/disconnection of a hose to liquid communication assembly 20. Primary spill receptacle 12 may optionally include stiffener ribs 13 (FIG. 3A) for enhanced structural rigidity.

Referring now to FIG. 1A, liquid communication assembly 20 includes an upper portion connectable to a liquid delivery device, shown as swivel adapter 32, and a lower portion coupled to the central aperture of tank adapter 22, shown as DT riser clamp 36. In the exemplary embodiment illustrated in FIG. 1A, pipe nipple 34 is disposed between adapter 32 and riser clamp 36 to couple same. DT riser clamp 36 is adapted to sealingly, threadably engage with the central aperture extending through tank adapter 22. A plurality of apertures 38 are formed in DT riser clamp, and are positioned to be in fluid communication with fluid channel 40 formed in tank adapter 22 when DT riser clamp 36 is assembled to tank adapter 22, so that fluid channel 40 allows fluid to flow from primary spill receptacle 12 into liquid communication assembly 20 via apertures 38. O-ring or sealing element 42 may be disposed between DT riser clamp 36 and tank adapter 22 to create a fluid tight seal therebetween. DT riser clamp 36 may include one or more lugs or protuberances 44 to facilitate threaded engagement or disengagement with tank adapter 22, as described in detail below.

Pipe nipple 34 is threadably engaged with an upper portion of DT riser clamp 36. In the embodiment of spill collection system 10 illustrated in the figures, pipe nipple 34 constitutes the male threaded portion of the threaded engagement with DT riser clamp 36, a configuration which inhibits leakage of downwardly flowing fluid through liquid communication assembly 20. An upper end of pipe nipple 34 is threadably engaged with swivel adapter 32. On the other hand, since the male threaded portion of pipe nipple 34 is upwardly oriented, a seal or gasket 46 is disposed between pipe nipple 34 and swivel adapter 32 to prevent leakage at that junction.

Swivel adapter 32 includes lower portion 48 and upper portion 50 with one or more seals 52 disposed therebetween, so that upper portion 50 is rotatable with respect to lower portion 48. Upper portion 50 includes groove 54 around its outer surface configured to engage with a cooperating structure on a fluid hose (not shown) or other fluid delivery device. Groove 54 may also cooperate with retention mechanism 56 of top seal cap 58. Top seal cap 58 may be disposed at the top or outlet end of liquid communication assembly 20 to prevent contamination from entering liquid communication assembly 20 (and, thus, the underground storage tank to which it is attached), and/or to prevent escape of fluid vapors to the atmosphere via liquid communication assembly 20. Retention mechanism 56 may, for example, be spring loaded to promote a fluid or vapor tight seal between top seal cap 58 and liquid communication assembly 20. While swivel adapter 32 is included in the illustrated exemplary embodiment, it is contemplated that any suitable adapter (such as a non-swiveling adapter) may be used to fluidly connect a fluid hose to liquid communication assembly 20.

Figure 6A:
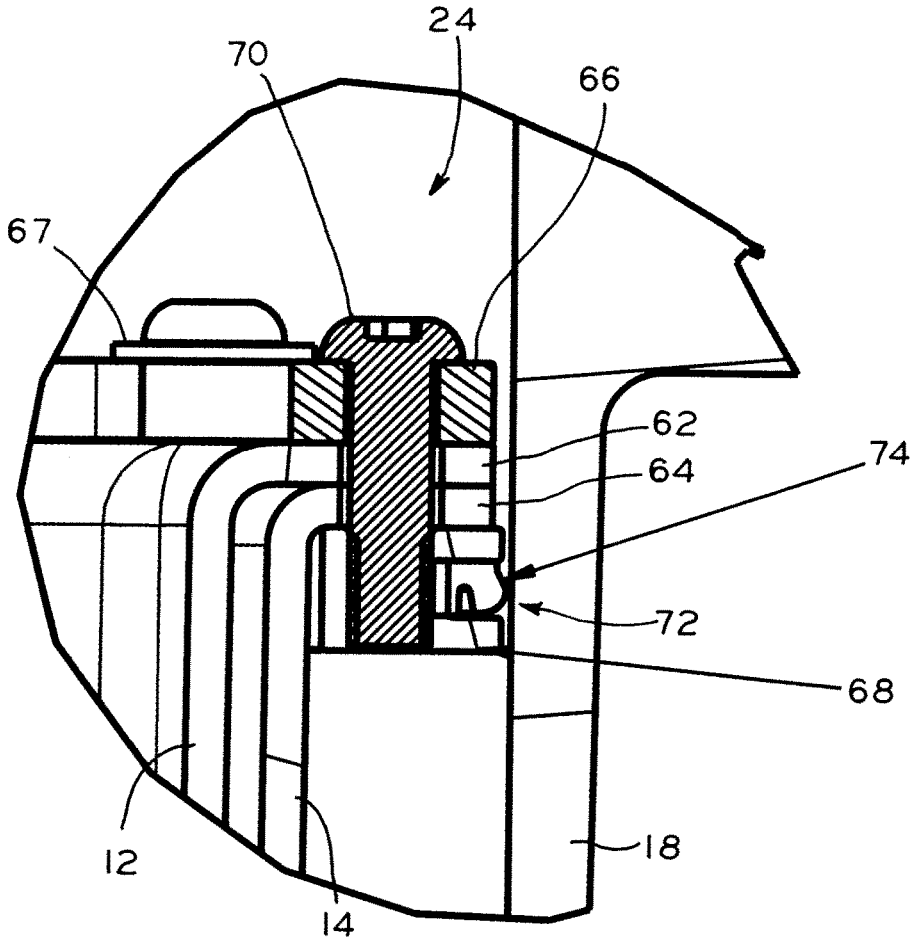
FIG. 6A is a partial section view of the spill collection system shown in FIG. 1A, illustrating an upper gasket assembly with a gasket in accordance with the present disclosure installed within a collar.
Figure 7A:
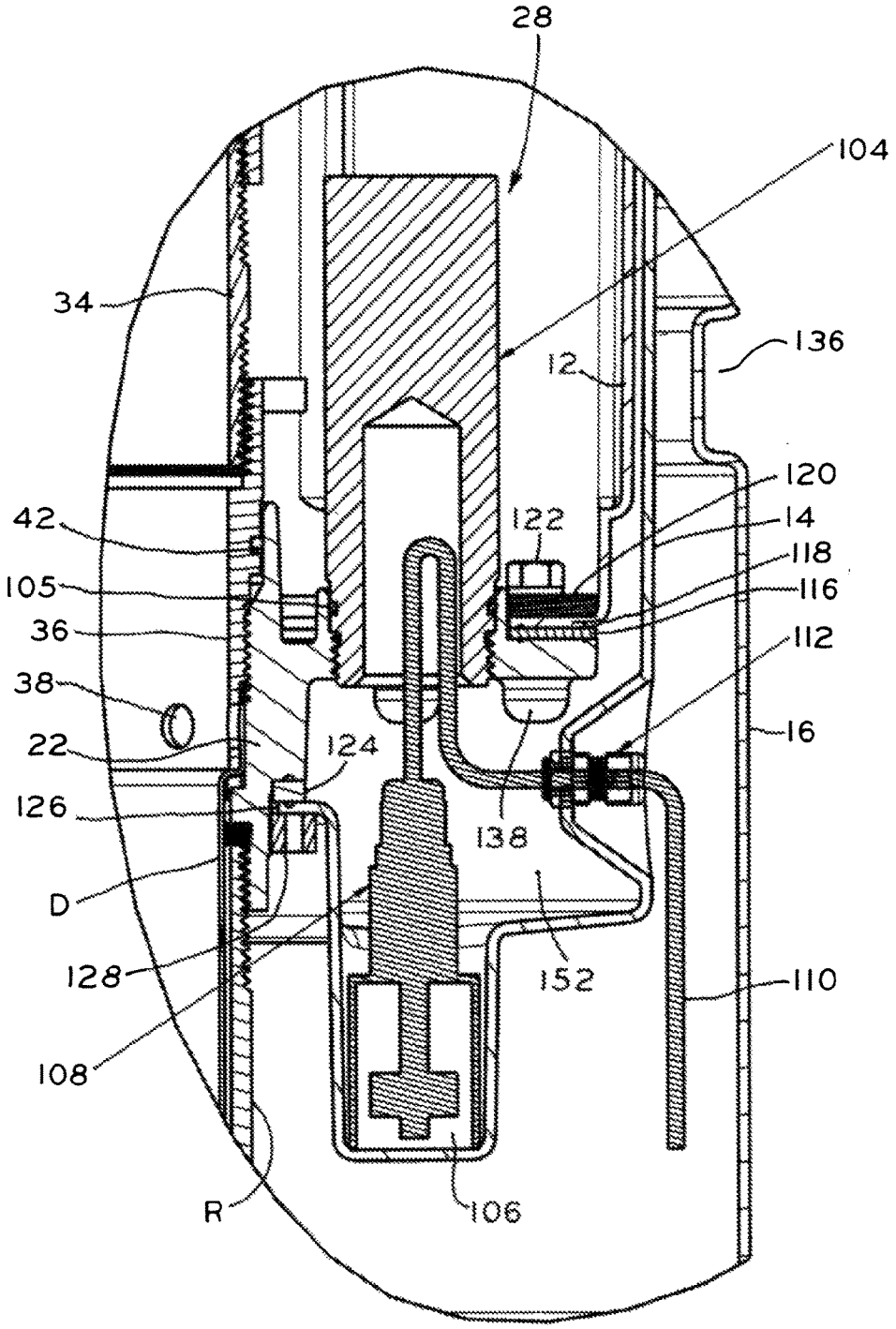
FIG. 7A is a partial section view of the spill collection system shown in FIG. 1A, illustrating an inspection port assembly with a float sensor.

Referring now to FIGS. 1A and 6A, primary and secondary spill receptacles 12, 14 include upper flanges 62, 64 respectively, which bound the upper openings of receptacles 12, 14. When primary spill receptacle 12 is fully received within the cavity of secondary spill receptacle 14, upper flanges 62, 64 are held adjacent to one another, with a gasket or sealant (not shown) disposed therebetween. Flanges 62, 64 are "sandwiched" between upper pressure distribution ring 66 and lower pressure distribution ring 68, which operate to distribute the pressure exerted by the connection of flanges 62, 64 to one another. Such connection is effected by a plurality of bolts 70 passing through rings 66, 68 which, when tightened, compress the gasket between flanges 62, 64 to create a fluid-tight seal and fix flange 62 to flange 64. Ring 68 may include a plurality of threaded apertures (not shown) to receive bolts 70. When flanges 62, 64 are sealingly coupled in this way, the upper opening of secondary spill receptacle 14 is effectively sealed from above, leaving only the upper opening of primary spill receptacle 12 accessible. Thus, the upper end of spill collection system 10 is sealed, in that interstitial space 152 (shown in FIG. 1A and described below) is inaccessible from such upper end.

Figure 3A:
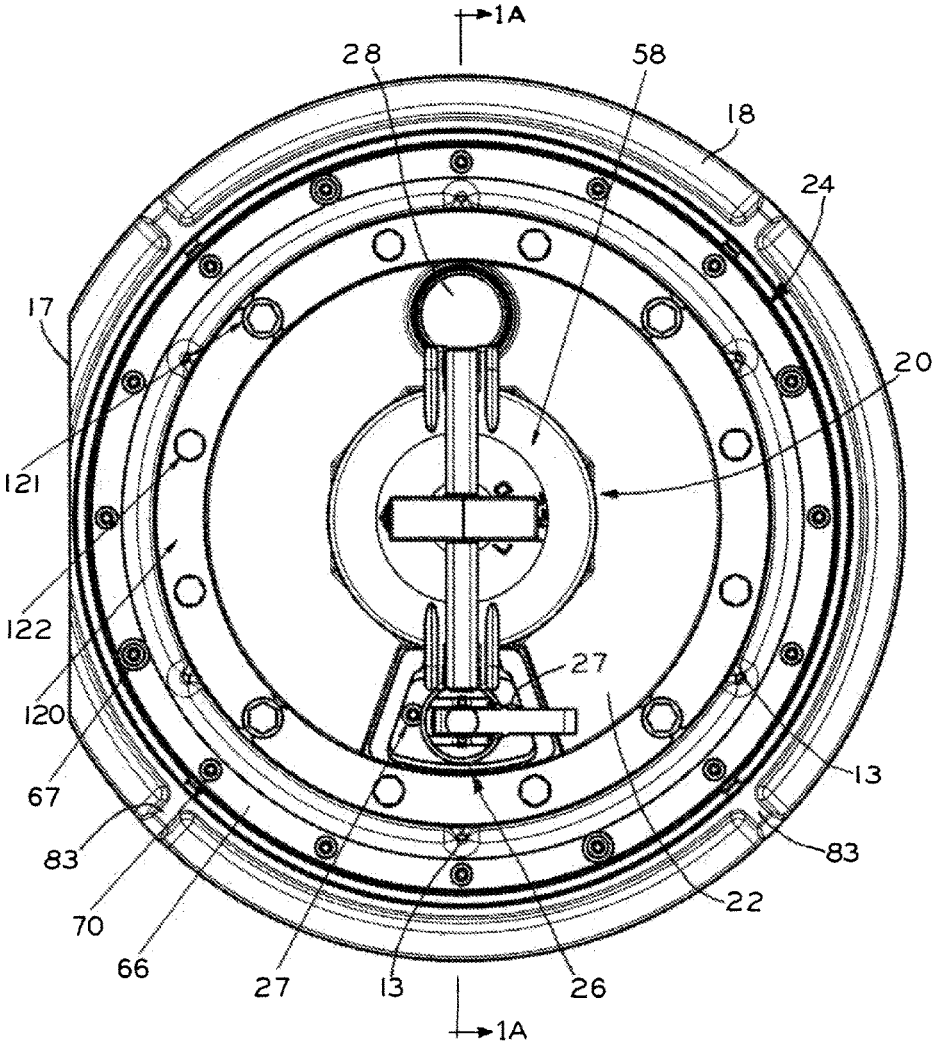
FIG. 3A is a top plan view of the spill collection system shown in FIG. 1A, shown without a cover.
Figure 6B:
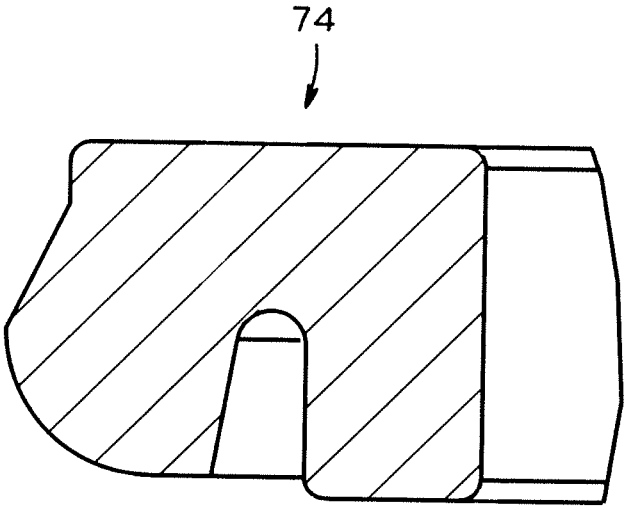
FIG. 6B is a section view of the gasket shown in FIG. 6A.

A groove or cavity 72 is formed in the outer portion of ring 68, with a v-shaped gasket or seal 74 received therein (FIG. 6B). V-shaped gasket 74 cooperates with an inner peripheral surface of collar 18 to provide a fluid tight seal isolating the interior of primary spill receptacle 12 from the space outside of secondary spill receptacle 14, as described in detail below. In an exemplary embodiment, ring 66 comprises multiple pieces or sections, such as four sections as shown in FIG. 3A. Washers 67 may be installed at the junctions between sections to aid in dispersing pressure caused by the tightening of bolts 70.

Figure 3B:
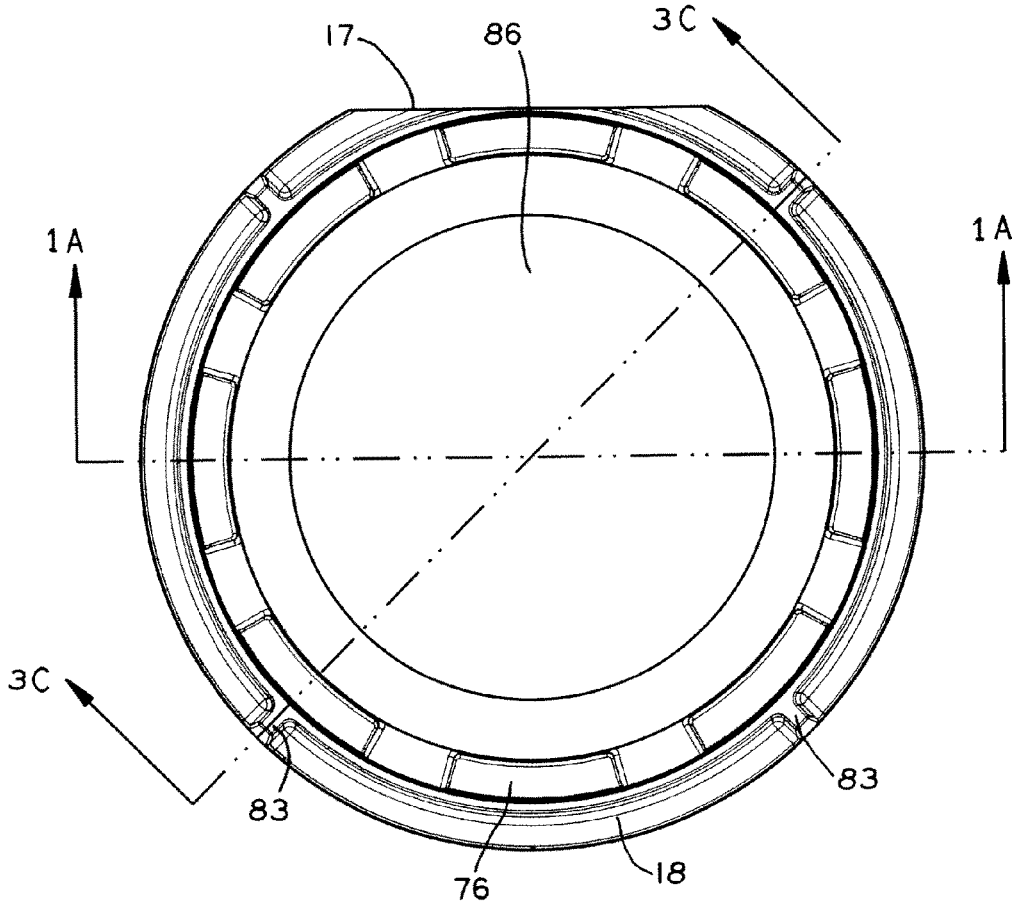
FIG. 3B is a top plan view of the spill collection system shown in FIG. 1A, shown with a cover attached.
Figure 3C:
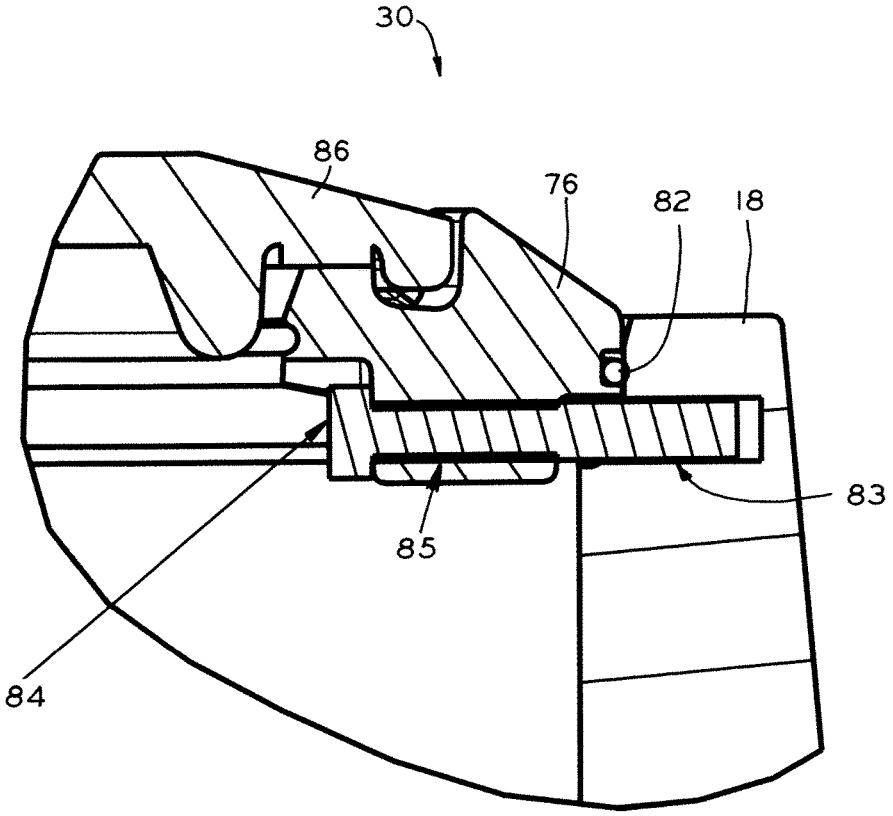
FIG. 3C is an elevation, section view of a portion of the spill collection system shown in FIG. 1A, illustrating a connection between a collar and a cover ring.

Cover assembly 30 includes cover ring 76 having a lower shoulder 78 sized to cooperate with upper shoulder 80 in the upper portion of collar 18. Cover ring 76 is received within collar 18 and may include a cover ring gasket or O-ring 82 disposed between cover ring 76 and collar 18 to provide a fluid tight seal therebetween. As best seen in FIG. 3C, cover ring 76 has at least one threaded aperture 85 extending between its inner and outer peripheral surfaces. Cover ring aperture 85 is positioned to align with corresponding apertures 83 (FIGS. 3A and 3C) in the inner peripheral surface of collar 18 when cover ring 76 is received within collar 18. Bolts 84 can be threaded through the threaded apertures formed in the inner peripheral surface of cover ring 76, and then received by apertures 83 in collar 18. Thus, with bolts 84 attached to cover ring 76 and protruding in to collar 18, cover ring 76 is fixed to collar 18. Cover 86 can then be received within cover ring 76 to seal or close primary spill receptacle 12 from the above-ground environment. In one embodiment, cover 86 may be a water resistant fiber plastic material resting within cover ring 76. Alternatively, cover 86 may be watertight, with a fiber plastic material fixedly attached by a clip or fastener to cover ring 76 and having a gasket disposed therebetween (not shown). Another watertight alternative is an iron material resting within cover ring 76 under its own weight with a gasket disposed therebetween (not shown).

Advantageously, with bolts 84 of cover ring 76 being under cover 86, a smooth unbroken profile is created between the top surface of collar 18 and the adjacent surface of cover 86. Thus, bolts 84 are not exposed to environmental degradation, such as corrosion or oxidation by contact with rain or snow. Moreover, a snowplow plowing snow from a concrete surface with spill collection system 10 disposed therein can drive a plow across cover ring 76 and cover 86 without snow becoming trapped within any orifice or depression formed thereon. Rain will be similarly prevented from becoming trapped.

Figure 8:
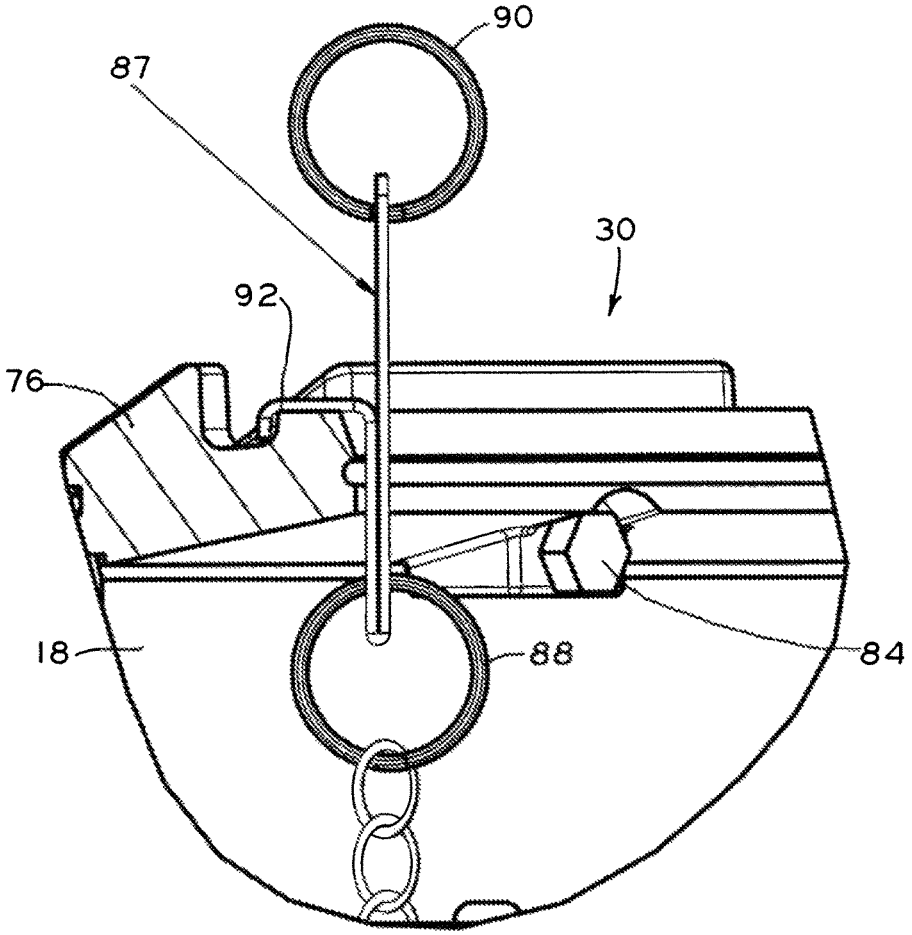
FIG. 8 is a partial section view of a cover assembly in accordance with the present disclosure, illustrating a pull ring assembly.

Referring now to FIG. 8, cover assembly 30 may optionally include drain clip or pull ring assembly 87, which operates as an actuator for drain valve 26. Drain clip 87 may be used when cover 86 is disengaged from cover ring 76. Lower ring 88 is connected to upper ring 90 by elongate clip portion 92. Lower ring 88 is also connected to a chain or string or other attachment device to drain valve assembly 26 (as discussed below). Upper ring 90 can be pulled upwardly to actuate or open drain valve 26 and allow fluid in primary spill receptacle 12 to drain into liquid communication assembly 20. Clip portion 92 can be hooked onto or otherwise coupled with cover ring 76 to hold drain valve assembly 26 in the open position. Alternatively, upper ring 90 can be manually held in a raised position to hold drain valve assembly 26 in the open position. Advantageously, cover 86 cannot be seated within cover ring 76 when drain clip 87 is clipped or hooked in place on cover ring 76, thereby preventing drain valve assembly 26 from being accidentally left in the open position after use of spill collection system 10. To replace cover 86, pull ring assembly 87 may be hooked to an undersurface of cover 86 (FIG. 1A) or placed anywhere within cavity 154, for example.

Figure 4:
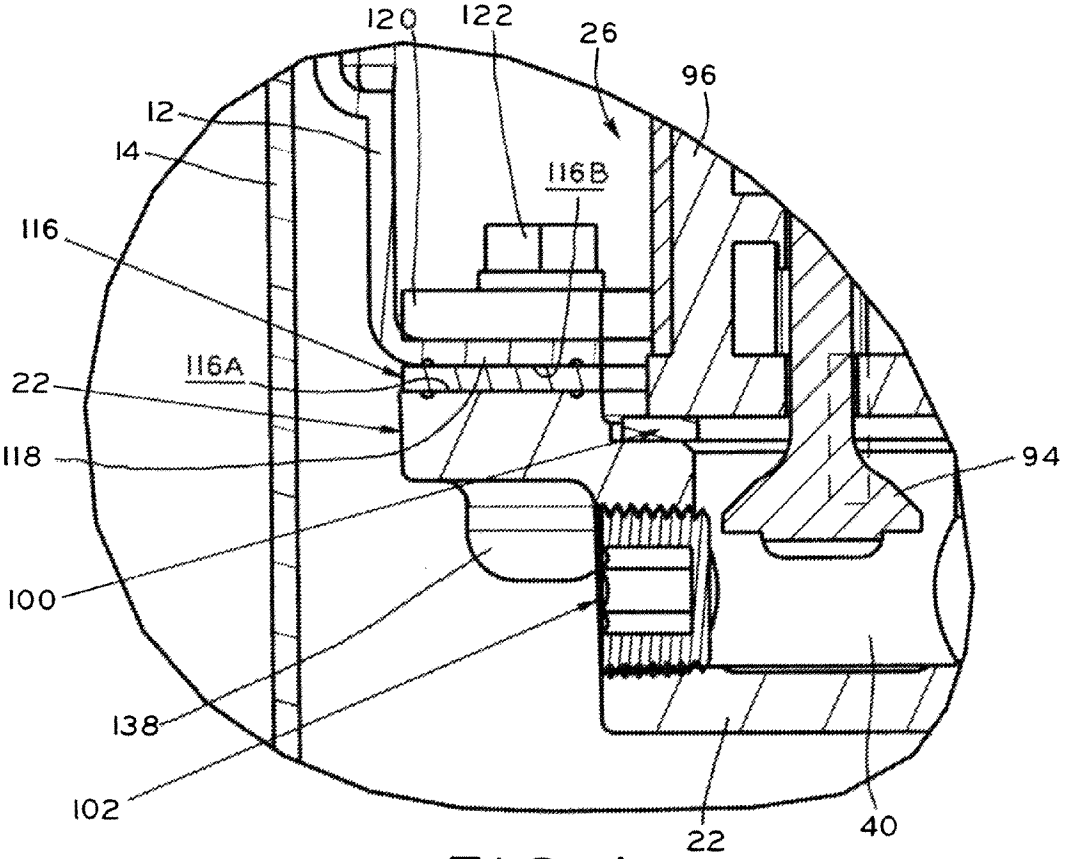
FIG. 4 is a partial section view of the spill collection system shown in FIG. 1A, illustrating a drain valve and a connection between a primary spill receptacle and a tank adapter.

Referring now to FIGS. 1A and 4, drain valve assembly 26 may optionally be included with spill collection system 10. Assembly 26 includes valve body 94 which is received within housing 96 and biased in an upward position by compression spring 98 (FIG. 1A). Valve gasket 100 is disposed between housing 96 and a drain valve aperture formed in tank adapter 22, to which housing 96 is attached. Valve gasket 100 prevents leakage or seepage of fluid from primary spill receptacle 12 to fluid channel 40 when drain valve assembly 26 is closed. When drain valve assembly 26 is open, cavity 154 of primary spill receptacle 12 is placed in fluid communication with the central aperture of tank adapter 22, allowing fluid contained within primary spill receptacle 12 to flow out of spill collection system 10 via fluid channel 40 and apertures 38 formed in DT riser clamp 36 FIG. 1A). In the closed position, cavity 154 of primary spill receptacle 12 is fluidly isolated from the central aperture of tank adapter 22.

Optionally, plug 102 may be provided within tank adapter 22 aligned with fluid channel 40 and proximal valve assembly 26 to plug the cross-drilled hole that forms fluid channel 40. Plug 102 may also facilitate access to fluid channel 40, such as for initial installation of valve assembly 26, clearing blockages in channel 40, or the like.

Figure 7B:
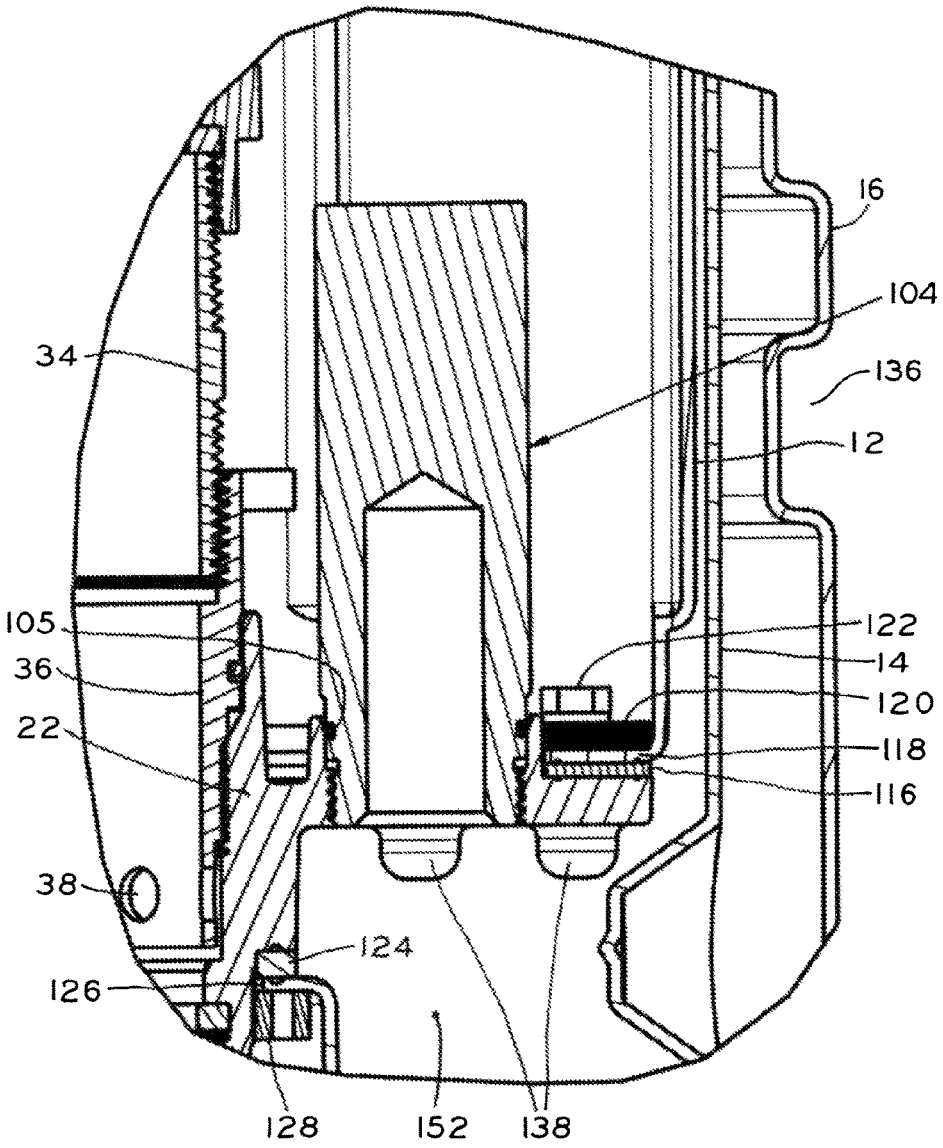
FIG. 7B is a partial section view of the inspection port assembly of FIG. 7A, shown without the float sensor.

Inspection port assembly 28 facilitates monitoring of a fluid level in secondary spill receptacle 14. Referring now to FIGS. 1A, 7A and 7B, inspection port assembly 28 includes inspection port pipe 104, which is threadably engaged with an inspection port aperture formed in tank adapter 22 such that the aperture is in fluid communication with interstitial space 152 when inspection port assembly 28 is removed. The inspection port aperture is placed to dispose inspection port pipe 104 above a well or a recess 106 formed in secondary spill receptacle 14. Float sensor 108 may be received within well 106 (FIG. 7A). Float sensor 108 has a cable 110 which passes through a hole in secondary spill receptacle 14 (drilled on installation or pre-drilled) via a cord grip 112 and out to a controller or an alarm or the like. Cable 110 may also pass through a hole in exterior wall 16 and be brought to the surface, such as through conduit in the surrounding backfill material. Float sensor 108 detects fluid accumulation in well 106 and outputs a signal via cable 110 when a predetermined level of fluid accumulation has occurred, as discussed in detail below.

Advantageously, float sensor 108 is replaceable. Inspection port pipe 104 may be removed from tank adapter 22 to expose float sensor 108. An excess of cord may be stored within inspection port pipe 104 so that float sensor 108 may be removed from well 106 and subsequently tested, such as by turning float sensor 108 upside down. If float sensor 108 is found to be malfunctioning, it may be replaced. Alternatively, float sensor 108 may be excluded from spill collection system 10 entirely, as shown in FIG. 7B, with only a window through inspection port pipe 104 for visual inspection of well 106. In another alternative, inspection port pipe 104' may include an aperture therethrough to receive gauge 114 extending from the top of inspection port pipe 104' to well 106 (FIG. 1A). Gauge 114 may be visible upon removal of cover 86, thereby allowing for visual inspection of a fluid level in well 106. Inspection port seal 105 (FIGS. 7A and 7B) may be disposed between tank adapter 22 and inspection port pipe 104 or 104' to provide a fluid-tight seal therebetween.

In addition to the gasket and seals discussed above, various other gaskets or seals may be utilized between various components to provide a fluid-tight seal therebetween. As best seen in FIG. 4, for example, primary seal 116 may be disposed between upwardly facing surface 116A of the base platform of tank adapter 22, and an adjacent downwardly facing surface 116B of lower flange 118 of primary spill receptacle 12. Surfaces 116A, 116B in abutting contact with seal 116 may be said to be "primary sealing surfaces," in that they are the surfaces responsible for creating sealing engagement between primary spill receptacle 12 and tank adapter 22. Flange ring 120 may be installed above lower flange 118 to promote even pressure on primary seal 116 when bolts 122 are used to secure tank adapter 22 to primary spill receptacle 12. In an exemplary embodiment, flange ring 120 comprises multiple pieces or sections, such as four sections as shown in FIG. 3A. Washers 121 may be installed at the junctions between sections to aid in dispersing pressure caused by the tightening of bolts 122.

Figure 5:
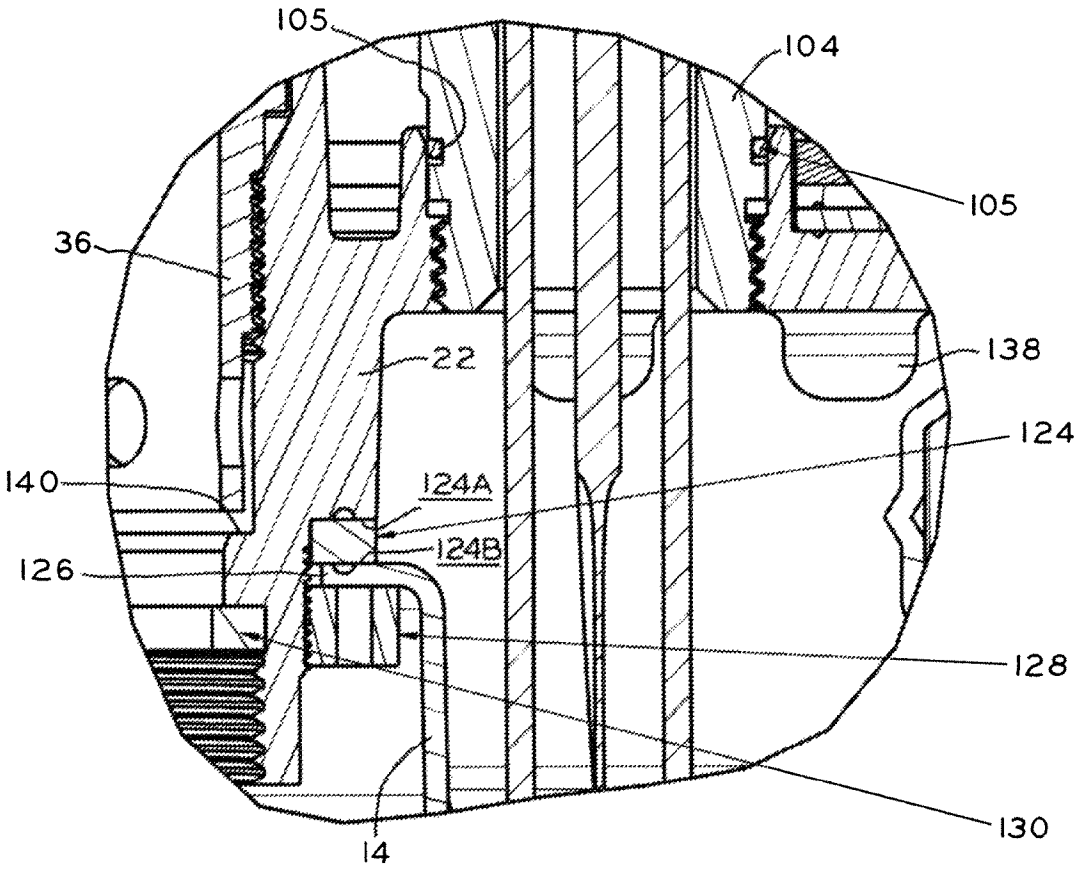
FIG. 5 is a partial section view of the spill collection system shown in FIG. 1A, illustrating sealing members and a float sensor.

Referring now to FIG. 5, secondary seal 124 may be disposed between downwardly-facing sealing surface 124A of tank adapter 22 and upwardly-facing surface 124B of lower flange 126 of secondary spill receptacle 14. Surfaces 124A, 124B in abutting contact with seal 124 may be said to be "secondary sealing surfaces," in that they are the surfaces responsible for creating sealing engagement between secondary spill receptacle 14 and tank adapter 22. Spanner nut 128 may be used to secure lower flange 126 to tank adapter 22, and to thereby compress secondary seal 124 into a fluid-tight engagement between tank adapter 22 and lower flange 126.

To create a fluid-tight seal between the central aperture formed through tank adapter 22 and the surrounding structures, additional sealing elements may be used. For example, referring in particular to FIGS. 1A and 5, tank adapter seal 130 is disposed between tank adapter 22 and riser pipe R. When tank adapter 22 is threadably engaged with riser pipe R, tank adapter seal 130 is compressed into a fluid tight engagement between tank adapter 22 and riser pipe R (FIG. 7A) to prevent fluid leakage therebetween.

Figure 2:
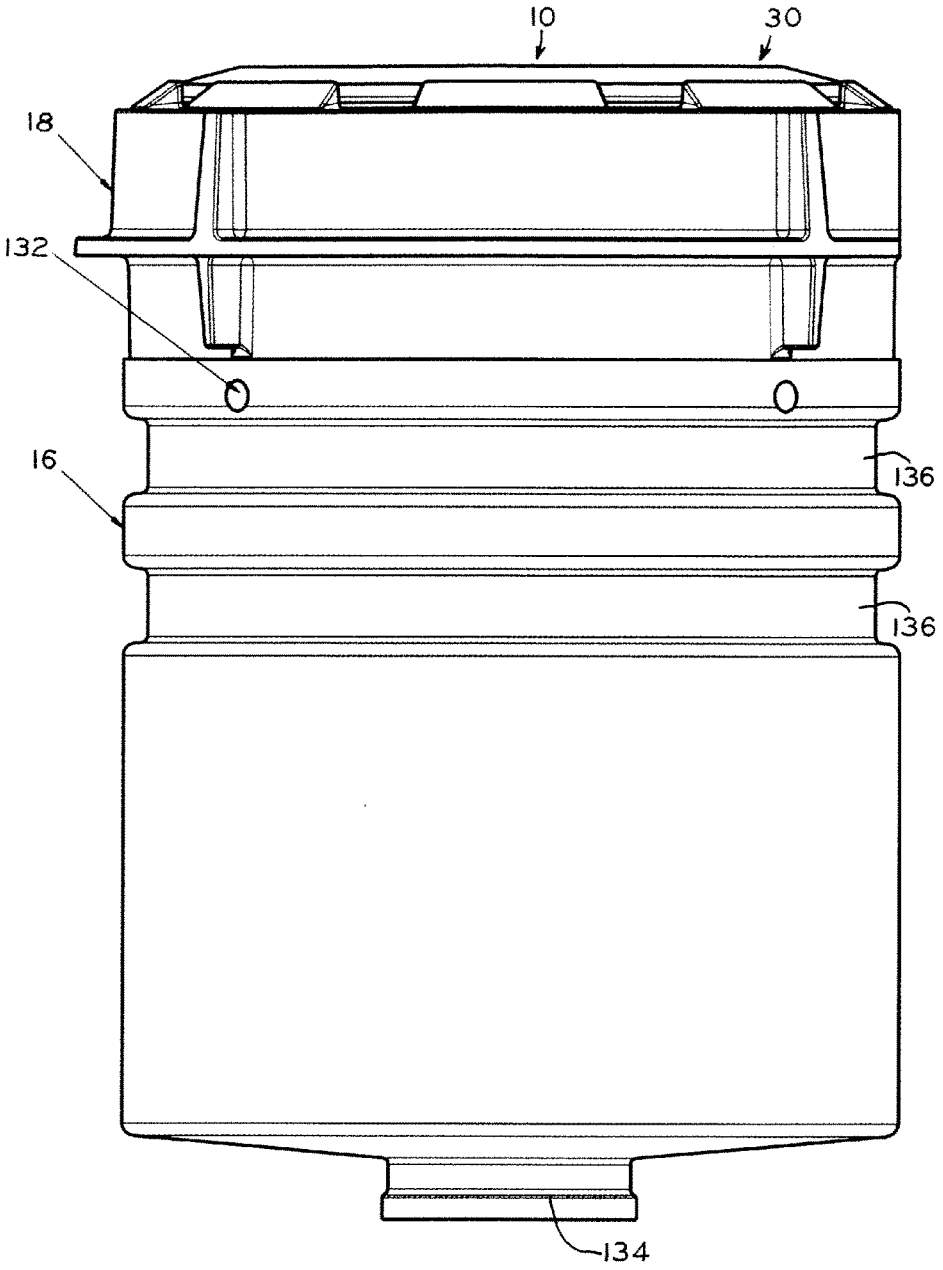
FIG. 2 is an elevation view of the spill collection system shown in FIG. 1A.

Assembly, installation and implementation of spill collection system 10 will now be discussed. A hole of appropriate size and shape is cleared around riser pipe R extending upwardly from an underground storage tank. Exterior wall 16 and collar 18 are pre-assembled using rivets 132 (FIG. 2) to couple an open upper end of exterior wall 16 and a lower end of collar 18. When so coupled, exterior wall 16 and collar 18 are placed into the hole with exterior wall aperture 134 fitting over the upwardly extending riser pipe R. Backfill or other appropriate filler material is filled in around exterior wall 16 with insets 136 formed in exterior wall 16 to inhibit subsequent axial motion of exterior wall 16 relative to riser pipe R. Concrete or other solid surface material is poured or installed around collar 18 to bring the concrete grade up to the level of the top of collar 18. Optionally, flat portion 17 (FIGS. 3A and 3B) may be provided in exterior wall 16 to allow a pair of spill containment systems 10 to be placed next to one another while maintaining the two liquid communication assemblies 20 in close proximity. In an exemplary embodiment, for example, flat portions 17 on a pair of exterior walls 16 allow for the centers of two respective liquid communication assemblies 20 to be separated by sixteen inches.

With exterior wall 16 and collar 18 installed in the surrounding backfill and/or concrete, spill receptacles 12, 14 and associated parts are ready to be received within the resulting space. Although primary and secondary spill receptacles 12 and 14 and tank adapter 22 may be installed one by one into exterior wall 16, these components may advantageously be preassembled in to spill receptacle subassembly 15 (FIG. 1B) before being lowered into collar 18 and exterior wall 16.

As shown in FIG. 1B, subassembly 15 includes primary and secondary spill containers 12, 14 joined by tank adapter 22 and the components and seals contained therein. To assemble subassembly 15, tank adapter 22 is first attached to secondary spill receptacle 14. Secondary spill receptacle 14 includes secondary seal 124 and spanner nut 128 loosely installed thereon. As tank adapter 22 is received by an aperture formed adjacent lower flange 126 of receptacle 14, tank adapter 22 threadably engages spanner nuts 128. Upon full engagement with secondary spill receptacle 14, tank adapter 22 secures and compresses secondary seal 124. With tank adapter 22 now secured to secondary spill receptacle 14, primary spill receptacle 12 may then be lowered into secondary spill receptacle 14 and attached to tank adapter 22 at lower flange 118 to form a sealed lower end of subassembly 15.

Primary spill receptacle 12 is then attached to secondary spill receptacle 14 at upper flanges 62, 64, as described above, to form a sealed upper end of subassembly 15. With the upper and lower ends sealed, interstitial space 152 is sealed. That is to say, once interstitial space 152 is sealed, no ingress of fluid into interstitial space 152 from outside may occur. This sealed arrangement is formed between the walls of primary and secondary spill receptacles 12, 14 and the base platform of tank adapter 22, leaving cavity 154 of primary spill receptacle 12 and the central aperture of tank adapter 22 available to collection and/or flow of fluid into and/or through spill collection system 10.

Tank adapter 22 may include a plurality of protuberances 138 with blind holes threaded therein to receive bolts 122. Optionally, drain valve assembly 26 and inspection port assembly 28 or 28' may be installed to primary spill receptacle 12 before lowering the subassembly into exterior wall 16 and collar 18. Alternatively, drain valve assembly 26 and/or inspection port assembly 28 or 28' may be installed after the subassembly is installed, or may not be installed at all.

With primary spill receptacle 12, secondary spill receptacle 14, tank adapter 22, associated seals and gaskets of assembly 15, and any optional assemblies now preassembled, subassembly 15 may be lowered through collar 18 into exterior wall 16. V-shaped gasket 74 of upper gasket assembly 24 engages a machined surface on the interior of collar 18 to sealingly engage therewith, while also allowing axial movement of subassembly 15 with respect to collar 18 (as described below). The subassembly is rotated to place tank adapter 22 in threaded engagement with corresponding threads of riser pipe R (FIG. 7A). When riser pipe R is firmly seated against seal 130, primary and secondary spill receptacles 12, 14 are installed and ready to receive liquid communication assembly 20. Advantageously, riser pipe R may rise or fall, such as from subsidence or uplift at the grade level, without disrupting the slidable, sealing engagement between v-shaped gasket 74 and the interior surface of collar 18. The interior surface of collar 18 may be machined to a certain depth sufficient to allow a range of motion appropriate to local circumstances, or the entire surface may be machined to maximize the range of motion. In the illustrated embodiment of FIGS. 1A-7, the range of motion is approximately 3½ inches, though other ranges are contemplated within the spirit and scope of the present disclosure. An example of a spill collector assembly with a receptacle that is slidably fitted within a stationary housing can be found in U.S. Pat. No. 4,696,330, filed Aug. 14, 1986 and entitled SPILL COLLECTOR ASSEMBLY FOR LIQUID STORAGE VESSELS, the disclosure of which is hereby expressly incorporated herein by reference in its entirety.

Liquid communication assembly 20 may also be preassembled and installed to tank adapter 22 as an assembly, or may be installed within primary spill receptacle 12 piece by piece. Advantageously, assembling DT riser clamp 36 to pipe nipple 34 and pipe nipple 34 to swivel adapter 32 (as described above) saves time and effort in a field installation of liquid communication assembly 20. Prior to installation of liquid communication assembly 20 to tank adapter 22, drop tube D (FIG. 7A) is lowered in to riser pipe R through tank adapter 22. Tank adapter 22 includes shoulder 140 sized to cooperate with a lid or flange at the top of drop tube D. Thus, drop tube D may be installed to extend downwardly into riser pipe R (FIG. 7A) with a lip or flange of drop tube D engaging shoulder 140 to prevent further downward motion and to provide a liquid tight seal between drop tube D and tank adapter 22. As discussed above, drop tube D may include or receive one or more auxiliary systems such as an overfill protection device or other device. If drop tube D contains an overfill protection device, the liquid tight seal created by the lip of drop tube D advantageously isolates the ullage space of the storage tank from fluid channel 40 and liquid communication assembly 20. In an exemplary embodiment having a spill containment system attached to a riser pipe of a fuel storage tank, this isolation is particularly useful in light of the increased vapor pressures typically found in fuel storage tanks relative to the pressures within spill containment system 10.

Figure 9A:
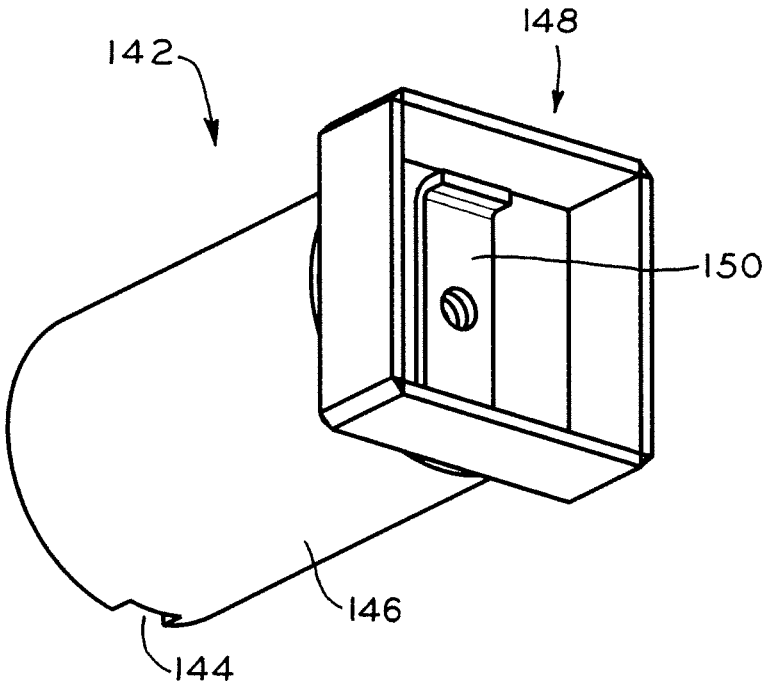
FIG. 9A is a perspective view of a removal tool for removing a liquid communication assembly or a spill containment subassembly in accordance with the present disclosure.
Figure 9B:
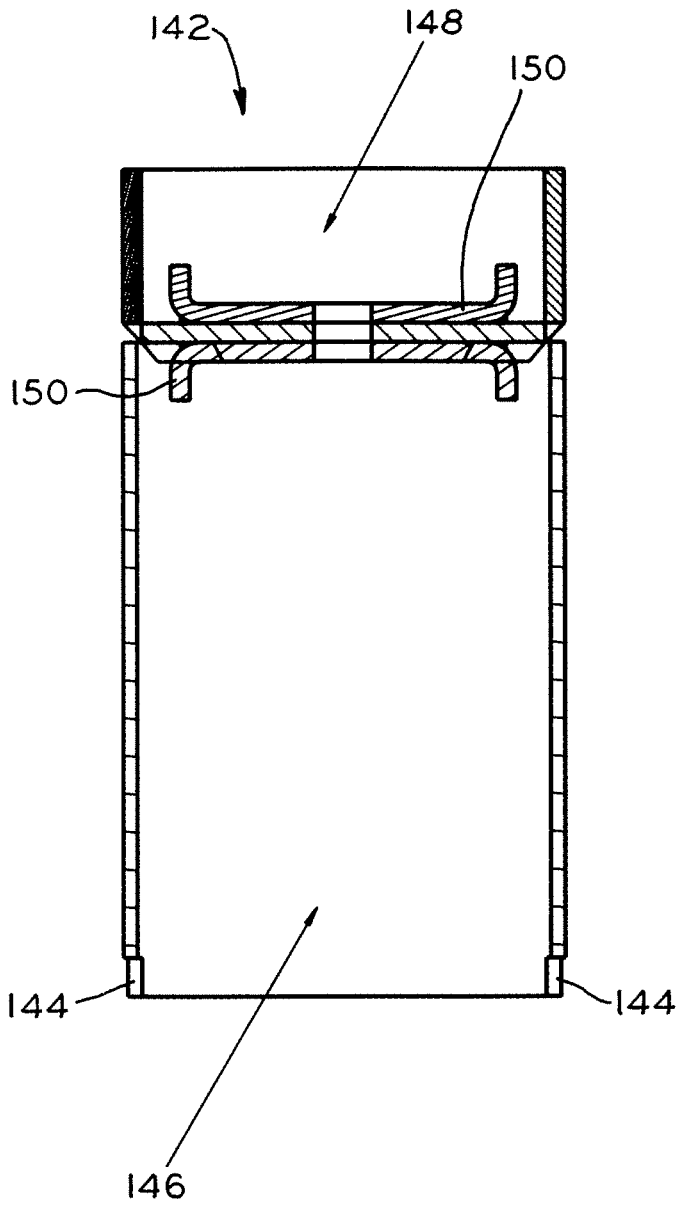
FIG. 9B is an elevation, section view of the tool shown in FIG. 9A.

With drop tube D installed, liquid communication assembly 20 may be lowered into primary spill receptacle 12 and threadably attached to tank adapter 22. To install or remove liquid communication assembly 20 to or from tank adapter 22, lugs 44 on DT riser clamp 36 may cooperate with tool 142, shown in FIGS. 9A and 9B. Tool 142 includes notches 144 in a lower portion 146, with the notches sized to cooperate with lugs 44. Lower portion 146 is of sufficient height to pass fully over swivel adapter 32 and pipe nipple 34 to engage lugs 44, so that rotation of tool 142 also rotates DT riser clamp 36. Upper portion 148 of tool 142 is welded to lower portion 146, and has a square profile sized to cooperate with an upper central portion of tank adapter 22 (which may, for example, have an octagonal shape), so that rotation of tool 142 also rotates tank adapter 22. Bracket 150 is fixed to the inside faces of upper portion 148 and lower portion 146, and is shaped to cooperate with a field wrench to transmit rotational forces to tool 142.

Liquid communication assembly 20 is fully installed when DT riser clamp 36 impinges upon drop tube D to urge a lip or flange of drop tube D against shoulder 140. With liquid communication assembly 20 fully installed, top seal cap 58 may be installed on liquid communication assembly 20 and cover assembly 30 may be installed to enclose exterior wall 16 and collar 18.

Advantageously, maintenance of drop tube D and any systems or components contained therein does not require removal of primary spill receptacle 12 or secondary spill receptacle 14. Removal of a single unit, i.e., liquid communication assembly 20, results in access to drop tube D, making maintenance tasks easier and more time efficient. Further, because the subassembly comprising primary and secondary spill receptacles 12, 14 and tank adapter 22 only engages riser pipe R at its bottom end and collar 18 at its upper end (via upper gasket assembly 24, FIG. 7A), the subassembly may be retrofitted into existing gravel guards or exterior walls with existing concrete rings. Once the subassembly is installed, liquid communication assembly 20, drain valve assembly 26 and inspection port assembly 28 may also be installed to gain the benefits thereof such as ease of installation, operation and maintenance.

Also advantageously, cover ring 76 may be removed, such as for service or inspection of subassembly 15, without disrupting the sealed interstitial space 152. As described herein, interstitial space 152 is formed by sealing lower and upper portions of primary and secondary spill containers 12, 14, either directly (via upper flanges 62, 64 at the upper portions) or indirectly (via tank adapter 22 at the lower portions). Cover ring 76 is not a necessary component for establishing or maintaining interstitial space, so cover ring 76 (and cover 86) can be installed, removed, or replaced while interstitial space 152 remains sealed.

Figure 10:
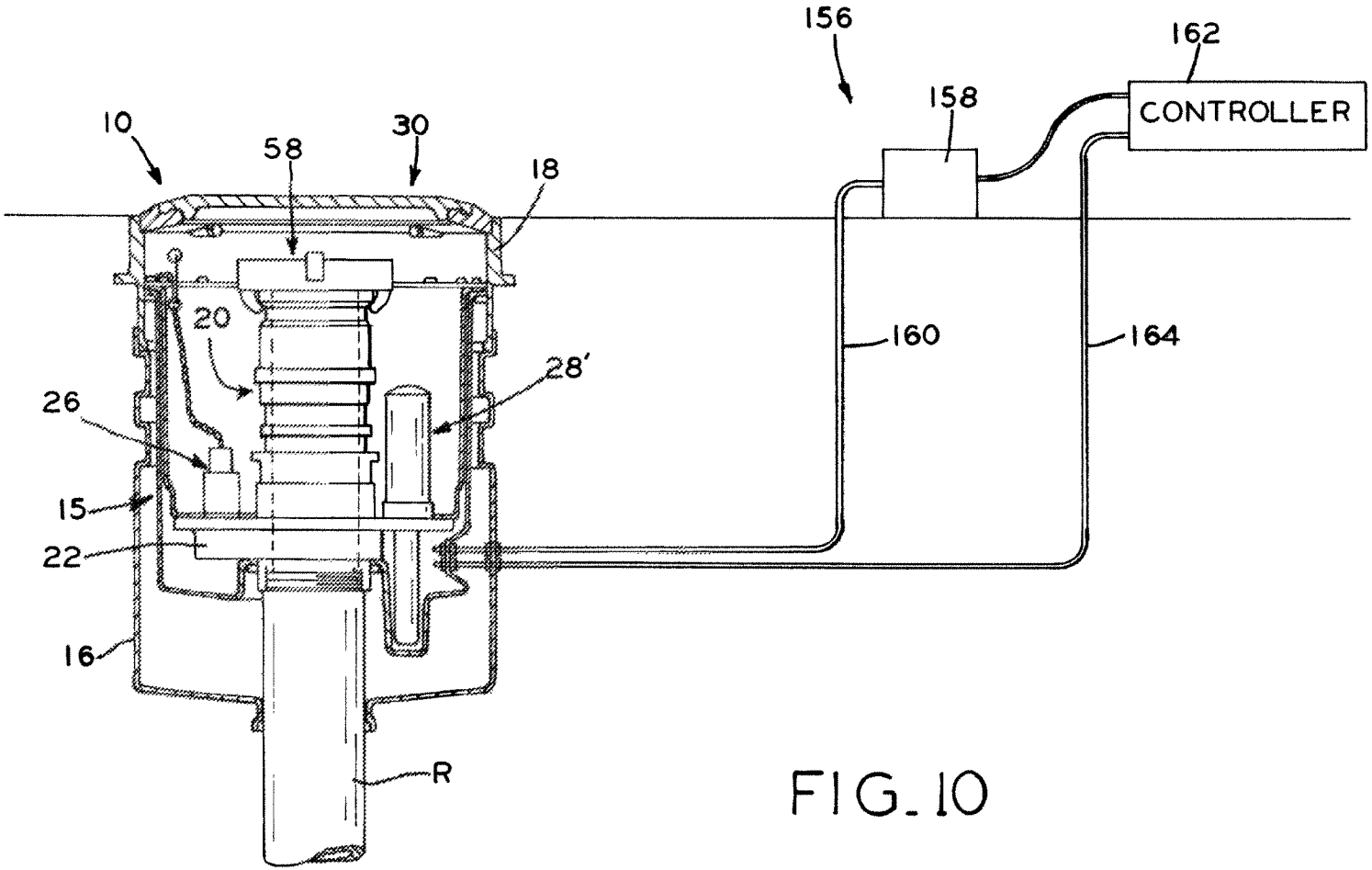
FIG. 10 is an elevation, section view of a spill collection system with a vacuum monitoring system in accordance with the present disclosure.

Referring now to FIG. 10, vacuum system 156 may be provided to create, maintain and monitor vacuum pressure within interstitial space 152. Vacuum pressure is created by vacuum generator 158, which is placed in fluid communication with interstitial space 152 by vacuum-creation conduit 160. This vacuum pressure is monitored continuously (or at regular intervals) for leaks by vacuum monitoring device 162, which is also in fluid communication with interstitial space 152 via vacuum-monitoring conduit 164. For example, vacuum conduit 164 may be in fluid communication with interstitial space 152 at a one end, and attached to vacuum monitoring device 162 at the other end so that monitoring device 162 is constantly updated as to the condition of the vacuum pressure within interstitial space 152. Vacuum monitoring device 162 may be located remotely from subassembly 15, as shown in FIG. 10. Optionally, an alarm may be integrated into vacuum monitoring device 162 to indicate an unacceptable loss in vacuum pressure within interstitial space 152. In an exemplary embodiment, vacuum monitoring device 162 monitors the rate of change of vacuum pressure, as described below. Where vacuum pressure is slowly lost, and the rate of change is not unacceptably high, vacuum monitoring device 162 may not activate an alarm, but instead may activate vacuum generator 158 to replenish the vacuum pressure within interstitial space 152. Exemplary methods and apparatuses which may be used for monitoring vacuum pressure in interstitial space 152 are disclosed in U.S. Pat. Nos. 7,051,579 and 7,334,456, both entitled METHOD AND APPARATUS FOR CONTINUOUSLY MONITORING INTERSTITIAL REGIONS IN GASOLINE STORAGE FACILITIES AND PIPELINES, which are commonly assigned with the present application, the disclosures of which are hereby expressly incorporated herein by reference in their entireties.

Advantageously, the integrity of the fluid-tight interstitial space 152 may be tested by applying a vacuum pressure with vacuum generator 158, and then monitoring the vacuum pressure over time. If the vacuum pressure is released too quickly, it may be inferred that a leak has developed between interstitial space 152 and the ambient outside environment. For example, a vacuum pressure test kit may include a vacuum port (not shown) attachable to the threaded hole in tank adapter 22 normally occupied by inspection port assembly 28 or 28' (FIG. 7A). Once firmly attached, a vacuum is created in interstitial space 152 via a vacuum generator 158, which may be in fluid communication with the vacuum port via vacuum-creation conduit 160. Upon reaching a vacuum pressure sufficiently lower than the ambient atmospheric pressure, vacuum generator 158 is turned off and the vacuum level is monitored over a period of time. If the vacuum pressure approaches atmospheric pressure at an unacceptably high rate of change, an alarm is sounded by vacuum monitoring device 162, and an operator may then find and fix the leak point. The unacceptably high rate of vacuum decline will vary based on system parameters and user needs.

A unique characteristic of spill collection system 10 is that subassembly 15 is a self-contained unit capable of assembly and quality testing at a remote location, so that on-site installation or removal of subassembly 15 is simplified. Additionally, the unique features of subassembly 15 facilitate effective and efficient production of subassembly 15 while ensuring reliable sealing of interstitial space 152 from the surrounding environment. For example, lower flange 118 of primary spill receptacle 12 and lower flange 126 of secondary spill receptacle 14 are both coupled to a single tank adapter 22. This single-tank adapter design joins primary and secondary spill receptacles 12, 14 in a robust manner, while also facilitating proper alignment of seals 116, 124 with adjacent structures. The single, unitary tank adapter 22 also allows for a simpler assembly and installation procedure by reducing the number of parts in the design, thereby promoting cost efficiency. Moreover, tank adapter 22 provides a single or unitary base to which a number of individual components attach, including spill receptacles 12, 14, valve assembly 26, and/or inspection port assembly 28 or 28', thereby providing a versatile and strong foundation for spill containment system 10.

Advantageously, the use of a single, unitary tank adapter 22 eliminates a possible leak path inherent to spill containment systems having a separate part for primary and secondary spill containers. For example, tank adapter 22 has only one threaded connection between adapter 22 and riser pipe R. Thus, the likelihood of tank adapter 22 developing a leak at the main threaded connection is half that of a system having two container support surfaces with a threaded connection for each.

Once installed, spill collection system 10 provides a double-walled spill collector assembly with interstitial space 152 formed between primary spill receptacle 12 and secondary spill receptacle 14 (FIG. 1A). Put another way, interstitial space 152 is the remaining space within the cavity of secondary spill receptacle 14 that is not displaced by primary spill receptacle 12. During normal operation, interstitial space 152 will not have any fluid contained therein. Spills or intrusion of foreign substances such as precipitation will collect in cavity 154 of primary spill receptacle 12, which may then be pumped out or drained into liquid communication assembly 20 (and, subsequently, into the storage tank) via drain valve assembly 26.

Any fluid in interstitial space 152 will pool in well 106, which is the lowest point within secondary spill receptacle 14. Float sensor 108, if installed, will then send a signal through cord 110 indicating the fluid accumulation condition. Alternatively, fluid level gauge 114 will register the elevated fluid level condition in well 106 and display or broadcast this information in a conventional manner. Once it is known that fluid is present in well 106, diagnosis of the cause of the fluid accumulation may commence and appropriate corrective action may then be taken.

Advantageously, the integrity of interstitial space 152 is not compromised by removal or installation of subassembly 15. Since the creation and maintenance of interstitial space 152 is independent of any interaction between subassembly 15 and outer wall 16 and/or collar 18, there is no need to expose interstitial space 152 to the surrounding environment when subassembly 15 is installed into, removed from, or moved within outer wall 16 and collar 18. Advantageously, the fluid-tight seal between interstitial space 152 and the surrounding environment, created upon assembly of subassembly 15, is maintained during subsequent installation and maintenance.

Yet a further advantage of spill collection system 10 is its ability to allow the axial movement between subassembly 15 and collar 18 via upper gasket assembly 24 without disrupting the sealing engagement between gasket 74 of assembly 24 and the inner peripheral surface of collar 18. This axial movement may occur naturally as a result of warming or cooling of the subterranean material around spill collection system 10, such as during a change of seasons. Permitting this axial movement prevents stress from forming in the components of system 10, while maintenance of the seal between gasket assembly 24 and collar 18 maintains the ability of spill collection system 10 to prevent spilled fluid from seeping into the surrounding environment.

Further, because gasket 74 is located outside of interstitial space 152, the sealing of interstitial space 152 (described above) will not be compromised by this axial movement, either during installation (which involves axial movement as subassembly is lowered through collar 18) or as a result of ambient forces while system 10 is in service.

While this invention has been described as having an exemplary design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A fluid spill collector assembly comprising:

a primary receptacle including:

an upper primary receptacle end having an upper primary receptacle opening;

a lower primary receptacle end having a lower primary receptacle opening;

a primary receptacle wall extending between said upper and lower primary receptacle ends, said primary receptacle wall defining a primary receptacle cavity;

a secondary receptacle including:

an upper secondary receptacle end having an upper secondary receptacle opening;

a lower secondary receptacle end having a lower secondary receptacle opening; and a secondary receptacle wall extending between said upper and lower secondary receptacle ends, said secondary receptacle wall defining a secondary receptacle cavity, said primary receptacle received within said secondary receptacle cavity, said upper primary receptacle opening sealingly coupled to said upper secondary receptacle opening to form a sealed upper end of the assembly; and a single, unitary tank adapter having a base platform with an aperture extending therethrough, said base platform sealingly coupled to said primary lower receptacle opening and said lower secondary receptacle opening to form a sealed lower end of the assembly, said sealed upper end and lower ends of the assembly cooperating to form a sealed interstitial space between said primary receptacle wall and said secondary receptacle wall, wherein said primary receptacle cavity remains in fluid communication with said upper primary receptacle opening and said aperture of said tank adapter while said interstitial space is sealed.

2. The fluid spill collector assembly of claim 1, wherein said base platform of said tank adapter comprises:

a primary sealing surface disposed on an upper surface of said base platform, said primary sealing surface sealingly engaging said lower primary receptacle opening; and a secondary sealing surface disposed on a lower surface of said base platform, said secondary sealing surface sealingly engaging said lower secondary receptacle opening, whereby said primary sealing surface is spaced from said secondary sealing surface.

3. The fluid spill collector assembly of claim 1, further comprising a liquid communication assembly disposed within said primary receptacle cavity, said liquid communication assembly comprising:

an upper portion connectable to a liquid delivery device; and a lower portion coupled to said aperture of said tank adapter.

4. The fluid spill collector assembly of claim 3, wherein:

said upper portion of said liquid communication assembly comprises an adapter fixed to said lower portion; and said lower portion of said liquid communication assembly comprises a drop tube riser clamp threadably engaged to said aperture of said tank adapter, said drop tube riser clamp having at least one lug adapted to engage a removal tool, said liquid communication assembly removable from said tank adapter by using said lug to threadably disengage said drop tube riser clamp from said tank adapter.

5. The fluid spill collector assembly of claim 1, wherein said base platform of said tank adapter includes a drain valve aperture sized to receive a drain valve assembly, said drain valve aperture in fluid communication with said aperture of said tank adapter.

6. The fluid spill collector assembly of claim 1, further comprising an inspection port aperture sized to receive an inspection port assembly, said inspection port aperture in fluid communication with said interstitial space.

7. The fluid spill collector assembly of claim 1, further comprising a cover assembly comprising:

a collar including:

an upper collar portion;

a lower collar portion; and an inner collar peripheral surface extending from said upper collar portion to said lower collar portion, said inner peripheral surface having at least one radial collar aperture formed therein;

a cover ring at least partially received within said collar, said cover ring including:

an upper ring portion;

a lower ring portion;

an inner ring peripheral surface extending from said upper ring portion to said lower ring portion; and an outer ring peripheral surface opposite said inner ring peripheral surface, said cover ring having at least one radial ring aperture extending from said inner ring peripheral surface to said outer ring peripheral surface;

a fastener extending radially through said ring aperture and into said radial collar aperture to fix said cover ring to said collar; and a cover receivable within said cover ring, said cover blocking access to said primary receptacle cavity and said fastener when said cover is received within said cover ring.

8. The fluid spill collector assembly of claim 7, wherein said cover ring and said cover are removable from said collar while said interstitial space remains sealed.

9. The fluid spill collector assembly of claim 7, further comprising:

a drain valve received within said primary receptacle cavity, said drain valve moveable between an open position in which said primary receptacle cavity is in fluid communication with said aperture of said tank adapter, and a closed position in which said primary receptacle cavity is fluidly isolated from said aperture of said tank adapter; and a drain valve actuator removably attachable to said cover ring, said drain valve actuator operably coupled to said drain valve so that said drain valve is in the open position when said drain valve actuator is attached to said cover ring, said drain valve actuator preventing said cover from being received by said cover ring when said drain valve actuator is attached to said cover ring.

10. The fluid spill collector assembly of claim 1, further comprising a stationary collar having an upper collar portion, a lower collar portion, and an inner collar peripheral surface extending from said upper collar portion to said lower collar portion, wherein:

said sealed upper end of the assembly sealingly engages said inner collar peripheral surface while also allowing axial movement of said primary and secondary receptacles with respect to said stationary collar.

11. The fluid spill collector assembly of claim 10, wherein:

said primary receptacle includes a primary flange at said upper primary receptacle end, said secondary receptacle includes a secondary flange at said upper secondary receptacle end, and said fluid collector assembly further comprises a gasket coupled to at least one of said primary and secondary flanges, said gasket effecting the sealing engagement between said sealed upper end of the assembly and said inner collar peripheral surface.

12. The fluid spill collector assembly of claim 1, wherein said primary receptacle includes a primary flange at said upper primary receptacle end and said secondary receptacle includes a secondary flange at said upper secondary receptacle end, said fluid spill collector assembly further comprising:

a first pressure distribution ring coupled to said primary flange; and a second pressure distribution ring coupled to said secondary flange, said primary and secondary flanges sandwiched between said first and second pressure distribution rings when said upper primary receptacle opening is sealingly coupled to said upper secondary receptacle opening to form said sealed upper end of the assembly.

13. The fluid spill collector assembly of claim 12, further comprising:

a stationary collar having an upper collar portion, a lower collar portion, and an inner collar peripheral surface extending from said upper collar portion to said lower collar portion; and a gasket received within said second pressure distribution ring, said gasket effecting a sealing engagement between said sealed upper end of the assembly and said inner collar peripheral surface while allowing axial movement of said primary and secondary receptacles with respect to said stationary collar.

14. A fluid spill collector assembly comprising:

a stationary collar having an inner peripheral surface [with at least one radial collar aperture formed therein]; and a double-walled spill container assembly comprising:

an outer receptacle having a first open upper end, said outer receptacle sized to be receivable within said collar;

an inner receptacle having a second open upper end, said inner receptacle coupled to said outer receptacle to create a sealed interstitial space therebetween; and a seal coupled to at least one of said outer receptacle and said inner receptacle, said seal slidably engageable with said inner peripheral surface of said collar to create a fluid tight seal between said collar and said *double-walled* spill [collector] *container* assembly, said double-walled spill container assembly axially moveable with respect to said stationary collar while said interstitial space remains sealed.

15. The fluid spill collector assembly of claim 14, wherein said sealed interstitial space is sealed before said seal of said *double-walled* spill [collector] *container* assembly is engaged with said inner peripheral surface of said collar.

16. The fluid spill collector assembly of claim 14, further comprising a gravel guard having an open upper end, said stationary collar coupled with said open upper end of said gravel guard, said double-walled spill container received within said gravel guard when said seal is slidably engaged with said inner peripheral surface of said collar.

17. The fluid spill collector assembly of claim 14, wherein said outer receptacle includes an outer receptacle flange at said first open upper end, said inner receptacle includes an inner receptacle flange at said second open upper end, said inner and outer receptacle flanges coupled when said inner receptacle is coupled to said outer receptacle, said fluid spill collector assembly further comprising:

a first pressure distribution ring coupled to said inner receptacle flange; and a second pressure distribution ring coupled to said outer receptacle flange, said seal received within said second pressure distribution ring.

18. The fluid spill collector assembly of claim 14, *wherein at least one radial collar aperture is formed in said stationary collar,* further comprising a cover assembly comprising:

a cover ring at least partially received within said stationary collar, said cover ring including:

an upper ring portion;

a lower ring portion;

an inner ring peripheral surface extending from said upper ring portion to said lower ring portion; and an outer ring peripheral surface opposite said inner ring peripheral surface, said cover ring having at least one radial ring aperture extending from said inner ring peripheral surface to said outer ring peripheral surface;

a fastener extending radially through said radial ring aperture and into said radial collar aperture to fix said cover ring to said collar; and a cover receivable within said cover ring, said cover blocking access to said spill collector assembly and said fastener when said cover is received within said cover ring.

19. The fluid spill collector assembly of claim 18, further comprising:

a drain valve received within said inner receptacle, said drain valve moveable between an open position and a closed position; and a drain valve actuator removably attachable to said cover ring, said drain valve actuator operably coupled to said drain valve so that said drain valve is in the open position when said drain valve actuator is attached to said cover ring, said drain valve actuator preventing said cover from being received by said cover ring when said drain valve actuator is attached to said cover ring.

* * * * *